(12) United States Patent
Schiavoni et al.

(10) Patent No.: US 10,739,669 B2
(45) Date of Patent: Aug. 11, 2020

(54) TRANSPARENT LAYERED ELEMENT COMPRISING A DISPLAY REGION

(71) Applicant: SAINT-GOBAIN GLASS FRANCE, Courbevoie (FR)

(72) Inventors: Michele Schiavoni, Paris (FR); Cécile Ozanam, Palaiseau (FR); Patrick Gayout, Villemomble (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/469,400

(22) PCT Filed: Dec. 13, 2017

(86) PCT No.: PCT/FR2017/053538
§ 371 (c)(1),
(2) Date: Jun. 13, 2019

(87) PCT Pub. No.: WO2018/109375
PCT Pub. Date: Jun. 21, 2018

(65) Prior Publication Data
US 2020/0096854 A1    Mar. 26, 2020

(30) Foreign Application Priority Data

Dec. 13, 2016 (FR) .................................. 16 62388

(51) Int. Cl.
*G03B 21/62* (2014.01)
*G02B 5/02* (2006.01)
(Continued)

(52) U.S. Cl.
CPC .......... *G03B 21/62* (2013.01); *B32B 17/1022* (2013.01); *B32B 17/10036* (2013.01); *G02B 5/0221* (2013.01); *G02B 27/01* (2013.01)

(58) Field of Classification Search
CPC ..................................................... G03B 21/62
See application file for complete search history.

(56) References Cited

U.S. PATENT DOCUMENTS 4,818,045 A    4/1989  Chang
9,606,272 B2 *  3/2017  Sandre-Chardonnal .....................
                                                B32B 17/10
(Continued)

FOREIGN PATENT DOCUMENTS

EP    0 415 230 A2    3/1991
EP    0 506 560 A2    9/1992
(Continued)

OTHER PUBLICATIONS

International Preliminary Report on Patentability and the Written Opinion of the International Searching Authority as issued in International Patent Application No. PCT/FR2017/053538, dated Jun. 18, 2019.
(Continued)

*Primary Examiner* — Christopher E Mahoney
(74) *Attorney, Agent, or Firm* — Pillsbury Winthrop Shaw Pittman LLP (57) ABSTRACT

A layered element includes two transparent outer layers having approximately the same refractive index and each having a smooth outer main surface, the layered element including a screen zone with properties of diffuse reflection and specular transmission comprising a textured middle layer interposed between the outer layers, a peripheral zone with properties of specular reflection and specular transmission, and a transition zone with properties of diffuse reflection and specular transmission between the screen zone and the peripheral zone, which includes a textured middle layer interposed between the outer layers. The diffuse light reflection at any point of the transition zone is less than or equal to the diffuse light reflection at any point of the screen zone (Continued)

and the variation of the diffuse light reflection in the transition zone from the screen zone to the peripheral zone, in any direction joining the screen zone to the peripheral zone, is decreasing.

20 Claims, 5 Drawing Sheets

(51) Int. Cl.
*B32B 17/10* (2006.01)
*G02B 27/01* (2006.01)

(56) References Cited

U.S. PATENT DOCUMENTS

| | | | |
|---|---|---|---|
| 9,846,265 B2* | 12/2017 | Ehrensperger | B32B 17/10018 |
| 10,466,392 B1* | 11/2019 | Melcher | G03B 21/60 |
| 2002/0008926 A1 | 1/2002 | Freeman | |
| 2005/0141087 A1 | 6/2005 | Yoshida | |
| 2008/0075923 A1 | 3/2008 | Travis et al. | |
| 2010/0177380 A1* | 7/2010 | Nagahama | B32B 3/30 359/359 |
| 2015/0241603 A1 | 8/2015 | Fujii et al. | |
| 2017/0269360 A1* | 9/2017 | Yamaguchi | G02B 30/56 |

FOREIGN PATENT DOCUMENTS

| | | |
|---|---|---|
| WO | WO 2013/175129 A1 | 11/2013 |
| WO | WO 2015/063148 A1 | 5/2015 |
| WO | WO-2019151498 A1 * | 8/2019 ............ G02B 5/09 |

OTHER PUBLICATIONS

International Search Report as issued in International Patent Application No. PCT/FR2017/053538, dated Apr. 9, 2018.

* cited by examiner

TRANSPARENT LAYERED ELEMENT COMPRISING A DISPLAY REGION

CROSS-REFERENCE TO RELATED APPLICATIONS

This application is the U.S. National Stage of PCT/FR2017/053538, filed Dec. 13, 2017, which in turn claims priority to French patent application number 1662388 filed Dec. 13, 2016. The content of these applications are incorporated herein by reference in their entireties.

TECHNICAL FIELD OF THE INVENTION

The technical field of the invention is that of transparent glazing comprising a transparent layered element with properties of diffuse reflection defining at least one screen zone that can serve as a projection screen or back projection screen. Transparent glazing of this kind that can serve as a projection screen or back projection screen finds application, in particular, in the field of transport, for example for making glazing for aircraft, trains, motor vehicles (cars, trucks, etc.), in particular windscreens, side glazing or roof glazing.

TECHNOLOGICAL BACKGROUND OF THE INVENTION

Known glazing comprises the standard transparent glazing, which gives rise to specular transmission and reflection of radiation incident on the glazing, and translucent glazing, which give rise to diffuse transmission and reflection of radiation incident on the glazing.

Usually, reflection by glazing is called diffuse when radiation incident on the glazing at a given angle of incidence is reflected by the glazing in a plurality of directions. Reflection by glazing is called specular when radiation incident on the glazing at a given angle of incidence is reflected by the glazing at an angle of reflection approximately equal to the angle of incidence. Similarly, transmission through glazing is called specular when radiation incident on the glazing at a given angle of incidence is transmitted by the glazing at an angle of transmission approximately equal to the angle of incidence.

A projection screen comprises two faces or main surfaces, namely a first face on which the image is projected that comes from the light source positioned in the same region of space as the light source (direct projection) and a second opposite face on which the image projected on the first face optionally appears by transparency.

A back projection screen has a first face and a second opposite face possessing the same characteristics as those of the aforementioned projection screens. However, a back projection screen differs from a projection screen in that the user and the light source are not located in the same region of space but are on either side of the screen. Back projection involves placing the projector behind the glazing.

Hereinafter, unless stated otherwise, the term "projection" is used in a general way to denote both projection and back projection.

It is not conceivable to use transparent standard glazing as projection screens. In fact, this glazing does not have the property of diffuse reflection, and therefore does not allow images to be formed on any one of its faces and throws back reflections just like a mirror.

There have been many attempts to endow transparent standard glazing with additional properties allowing use thereof as a projection screen, while maintaining a clear view through the glazing.

WO 2013/175129 A1 describes glazing comprising a transparent layered element with properties of diffuse reflection allowing the projection of images, visible at a large viewing angle, while maintaining transparency of the glazing. However, it has been found that with such glazing, in certain conditions of use, in particular when the luminous contrast is not sufficiently pronounced between the two sides of the glazing, an observer positioned on the less luminous side perceives an impression of blurring or of "milky glazing" which limits the clarity of view. For certain applications, in particular in the automotive sector, this blurred and milky appearance, even if slight, may be regarded as unacceptable in viewing zones.

It is these drawbacks that the invention intends more particularly to overcome, by proposing transparent glazing that allows projection of images and that satisfies the criteria of clear vision stipulated in particular in the field of transport, while having a uniform overall appearance.

SUMMARY OF THE INVENTION

For this purpose, the invention relates to a transparent layered element comprising two transparent outer layers having approximately the same refractive index and each having a smooth outer main surface, the layered element comprising:

- a screen zone with properties of diffuse reflection and specular transmission comprising a textured middle layer interposed between the outer layers, which defines textured contact surfaces, parallel to one another, having a mean square slope Rdq strictly greater than 0.2°, the middle layer of the screen zone comprising at least one transparent layer with a refractive index different from that of the outer layers or a metallic layer, and
- a peripheral zone with properties of specular reflection and specular transmission,
- characterized in that the layered element comprises a transition zone with properties of diffuse reflection and specular transmission between the screen zone and the peripheral zone, the transition zone comprising a textured middle layer interposed between the outer layers, which defines textured contact surfaces, parallel to one another, having a mean square slope Rdq strictly greater than 0.2°, the middle layer of the transition zone comprising at least one transparent layer with a refractive index different from that of the outer layers or a metallic layer,
- and in that, on each side of the layered element, the diffuse light reflection at any point of the transition zone is less than or equal to the diffuse light reflection at any point of the screen zone and the variation of the diffuse light reflection in the transition zone from the screen zone to the peripheral zone, in any direction joining the screen zone to the peripheral zone, is decreasing or such that the curve passing through the value of diffuse light reflection at the junction of the transition zone with the screen zone and through the or each local maximum of the variation of the diffuse light reflection in the transition zone is decreasing, the decrease of the variation of the diffuse light reflection in the transition zone, or of the curve passing through the or each local maximum of the variation of the diffuse light reflection in the transition zone, being obtained by varying at least one parameter from the mean square slope and the total light reflection of the middle layer of the transition zone, in any direction joining the screen zone to the peripheral zone.

In the context of the invention, the diffuse light reflection at a point of a zone is the mean value of the diffuse light reflection on a reference surface centered on this point and whose dimension is the maximum from 1 mm×1 mm and 3 Rsm×3 Rsm, where Rsm is the mean width of the elements of the roughness profile of the middle layer of the zone.

In the sense of the invention, a local maximum of a variation is a point of the variation for which the derivative is zero and the variation is increasing before this point and then decreasing after this point. Moreover, in the sense of the invention, a variation or a curve is decreasing if, for two successive points of this variation or of this curve, the value of the next point is less than or equal to the value of the preceding point.

In the context of the invention, reflection or transmission by a zone is called specular when radiation incident on the zone at a given angle of incidence is reflected or transmitted by the zone with an angular deviation less than or equal to 2.5° relative to the incident radiation. Conversely, reflection or transmission by a zone is called diffuse when radiation incident on the zone at a given angle of incidence is reflected or transmitted by the zone with an angular deviation strictly greater than 2.5° relative to the incident radiation.

Each of the zones of the layered element from the screen zone, the transition zone, and the peripheral zone, has properties of specular transmission. Preferably, each of the zones of the layered element has blurring in transmission (Haze T) less than or equal to 10%, preferably less than or equal to 5%, even more preferably less than or equal to 3%. Preferably, each of the zones of the layered element has a clarity greater than or equal to 80%, preferably greater than or equal to 95%, even more preferably greater than or equal to 98%.

The invention may be implemented by opting for a decrease of the variation of the diffuse light reflection in the transition zone from the screen zone to the peripheral zone, which may in particular be a decrease according to a continuous gradient, or a decrease according to a stepped gradient comprising at least one step. As a variant, the invention may be implemented by opting for a reduction of the density of portions with diffuse reflection in the transition zone in the direction from the screen zone to the peripheral zone, which is translated into the presence of local maxima in the variation of the diffuse light reflection such that the curve passing through the value of diffuse light reflection at the junction of the transition zone with the screen zone and through these local maxima is decreasing.

Advantageously, in the case when the variation of the diffuse light reflection in the transition zone has at least one local minimum, the variation of the diffuse light reflection in the transition zone from the screen zone to the peripheral zone, in any direction joining the screen zone to the peripheral zone, is such that the curve passing through the or each local minimum of the variation of the diffuse light reflection in the transition zone and through the value of diffuse light reflection at the junction of the transition zone with the peripheral zone is decreasing.

The middle layer of the transition zone may be continuous or discontinuous. In the sense of the invention, a layer comprises two main surfaces parallel to one another. The thickness of a layer is measured between its two main surfaces, in a direction normal to said main surfaces.

In the context of the invention, a distinction is made between:
  on the one hand, the metallic layers for which the value of the refractive index is immaterial, and
  on the other hand, the transparent layers, in particular dielectric, for which the difference in refractive index relative to that of the outer layers has to be taken into account.

Dielectric material or layer means a material or a layer with low electrical conductivity, below 100 S/m.

Each outer layer of the layered element may be formed by a stack of layers, if the various layers making up the outer layer are constituted of transparent materials, in particular dielectric, all having approximately the same refractive index.

For each zone from the screen zone and the transition zone, the middle layer is formed:
  either by a single layer, which is a transparent layer, in particular dielectric, with a refractive index different from that of the outer layers or a metallic layer,
  or by a stack of layers, which comprises at least one transparent layer, in particular dielectric, with a refractive index different from that of the outer layers or a metallic layer.

According to the invention, to obtain the properties of diffuse reflection and specular transmission in each zone from the screen zone and the transition zone of the layered element, all the contact surfaces between two adjacent layers of the layered element, one of which is a transparent layer, in particular dielectric, and the other is a metallic layer, or which are two transparent layers, in particular dielectric, with different refractive indices, are textured and parallel to one another.

The diffuse reflection on each side of the layered element at the level of the screen zone and transition zone arises because each contact surface between two adjacent layers of the layered element, one of which is a transparent layer, in particular dielectric, and the other is a metallic layer, or which are two transparent layers, in particular dielectric, with different refractive indices, is textured. Thus, when radiation incident on the screen zone or transition zone on either side of the layered element reaches said contact surface, it is reflected by the metallic layer or owing to the difference in refractive index between the two transparent layers and, as the contact surface is textured, the reflection is diffuse.

For its part, specular transmission through the layered element arises because the two outer layers have smooth outer main surfaces and are made up of materials having approximately the same refractive index, and because all the contact surfaces between two adjacent layers of the layered element, one of which is a transparent layer, in particular dielectric, and the other is a metallic layer, or which are two transparent layers, in particular dielectric, with different refractive indices, are textured and parallel to one another.

In the sense of the invention, two transparent materials, in particular dielectric, have approximately the same refractive index, or their refractive indices are approximately equal when the absolute value of the difference between their refractive indices at 550 nm is less than or equal to 0.15. Preferably, the absolute value of the difference in refractive index at 550 nm between the materials making up the two outer layers of the layered element is less than 0.05, more preferably less than 0.015. In the sense of the invention, two transparent layers, in particular dielectric, have different refractive indices when the absolute value of the difference between their refractive indices at 550 nm is strictly greater than 0.15.

In the rest of this description, reference is made to the roughness profile or to the slopes (of the surface) of the middle layer of the screen zone or middle layer of the transition zone, it being understood that it is a misuse of language to denote the roughness profile or the slopes of each textured contact surface of the layered element that is located between two adjacent layers, one of which is a transparent layer, in particular dielectric, and the other is a metallic layer, or between two adjacent layers which are two transparent layers, in particular dielectric, with different refractive indices. To the extent that all these textured surfaces are parallel to one another in each zone from the screen zone and the transition zone of the layered element, there is actually a single roughness profile and a single distribution of slopes for each screen zone or transition zone, which we designate as "roughness profile (of the surface) of the middle layer of the zone" or "slopes (of the surface) of the middle layer of the zone".

In the context of the invention, the total light reflection from an outer layer of the layered element, expressed in %, is measured according to standard ISO 9050:2003 (illuminant D65; 2° Observer), positioning the light source in such a way that the radiation is normally incident on the element on the side of said outer layer. Moreover, the total light reflection from an outer layer of the layered element is taken as the basis for defining the diffuse light reflection from this outer layer, which is the part of the total light reflection corresponding to the light reflected at an angle strictly greater than 2.5° relative to the normal to the outer layer in question.

For each point of a zone of the layered element from the screen zone and the transition zone, the total light reflection at this point, or the diffuse light reflection at this point, is defined as the mean value of the total light reflection, or diffuse light reflection, on a reference surface that is centered on this point and is of a suitable size to be representative of the roughness profile of the middle layer of the zone in question. In the context of the invention, the reference surface used for defining the total light reflection, or the diffuse light reflection, at a point of a zone from the screen zone and the transition zone is a surface centered on this point, the size of which is the maximum from 1 mm×1 mm and 3 Rsm×3 Rsm, where Rsm is the mean width of the elements of the roughness profile of the middle layer of the zone in question, as defined in standard ISO 4287, measured using a MICROMEASURE 2 profilometer from the company STIL, on a surface of 1 mm×1 mm with a sampling pitch of 1 micron×1 micron.

In practice, the diffuse light reflection at a point of a zone of the layered element from the screen zone and the transition zone, from one of the outer layers, is determined as the product of the blurring in reflection at this point of the side of the outer layer in question by the total light reflection at this point of the side of the outer layer in question. Given the angular limit of 2.5° for diffuse light reflection, the blurring in reflection at a point of a zone of the layered element from the screen zone and the transition zone is the proportion of the slopes of the middle layer, taken on the reference surface centered on this point, which are such that the value of the slope is strictly greater than) ($\frac{1}{2}$)arcsin(sin(2.5°/n2)=)($\frac{1}{2}$) arcsin(sin(2.5°/n4), where n2 and n4 are the approximately equal refractive indices of the two outer layers of the zone of the layered element.

In the context of the invention, the proportion of the slopes, corresponding to the blurring in reflection as defined above, is determined by measuring the profile z=f(x,y) of the surface of the textured middle layer of said zone using a MICROMEASURE 2 profilometer from the company STIL, on a surface of 1 mm×1 mm with a sampling pitch of 1 micron×1 micron, and by calculating at each point of the measured surface the local slope 0, according to the relation:

$$\theta = \arctan\left(\sqrt{\left(\frac{\partial z}{\partial x}\right)^2 + \left(\frac{\partial z}{\partial y}\right)^2}\right), \text{ where } \frac{\partial z}{\partial x} \text{ and } \frac{\partial z}{\partial y}$$

are the partial derivatives of the height calculated with the Sobel filter.

Hereinafter, the roughness parameter of a surface is taken to be the mean square slope Rdq of the surface as defined in standard ISO 4287, measured using a MICROMEASURE 2 profilometer from the company STIL, on a surface of 1 mm×1 mm with a sampling pitch of 1 micron×1 micron.

Throughout this application, for the measurements performed using the MICROMEASURE 2 profilometer from the company STIL, the measurement conditions are as follows. The measurement head consists of a chromatic lens combined with a "magnifier" having the characteristics: numerical aperture of 0.42; maximum measurement angle of 25°; resolution in Z of 0.04 microns; lateral resolution of 4.5 microns. The roughness parameters are extracted with a low-pass Gaussian filter having a cut-off length of 19 microns (which filters the microasperities) and a high-pass Gaussian filter having a cut-off length of 1 mm (which filters the undulations).

The following definitions are used in the context of the invention:
  A transparent element is an element through which there is transmission of radiation at least in the wavelength ranges useful for the intended application of the element. As an example, when the element is used as glazing for a building or a vehicle, it is transparent at least in the visible wavelength range.
  Transparent glazing is a rigid, organic or mineral transparent substrate.
  A smooth surface is a surface for which the surface irregularities are of dimensions less than the wavelength of the radiation incident on the surface, so that the radiation is not deflected by these surface irregularities. The incident radiation is then transmitted and reflected in specular fashion by the surface. In the context of the invention, a smooth surface is a surface having a mean square slope Rdq as described above less than or equal to 0.2°.
  A textured surface is a surface for which the surface properties vary at a scale greater than the wavelength of the radiation incident on the surface. The incident radiation is then transmitted and reflected diffusely by the surface. In the context of the invention, a textured surface is a surface having a mean square slope Rdq as described above strictly greater than 0.2°.

The transparent layered element according to the invention makes it possible to obtain:
  specular transmission and diffuse reflection of radiation incident on the screen zone of the layered element from one or other of its outer layers,
  specular transmission and specular reflection of radiation incident on the peripheral zone of the layered element from one or other of its outer layers, and
  a uniform overall visual appearance of the layered element, from one or other of its outer layers, owing to the transition zone, allowing integration of the screen zone relative to the peripheral zone without pronounced visual delimitation between the two zones.

Transparent glazing comprising a transparent layered element of this kind thus has a uniform overall visual appearance and at the same time makes it possible to project images in at least one zone of the glazing dedicated to projection, which corresponds to the or each screen zone of the layered element, and ensure clear vision through the glazing in at least one zone of the glazing dedicated to vision, which corresponds to the or each peripheral zone of the layered element.

The transparency in transmission and the diffuse reflection of the transparent layered element, and of transparent glazing incorporating it, contribute to obtaining good luminosity of the images projected on the screen zone. The middle layer of the screen zone promotes diffuse reflection, which allows direct projection of an image on any one of the sides of the transparent layered element, and of transparent glazing incorporating it, the image being formed at the level of the middle layer.

Advantageously, on each side of the layered element and in any direction joining the screen zone to the peripheral zone, the change in diffuse light reflection in the transition zone is less than or equal to (20%)RL(ZE)/mm, where RL(ZE) is the mean total light reflection of the screen zone.

Preferably, the total light reflection RL(ZE) is constant in the screen zone.

In one embodiment, on each side of the layered element, the variation of the diffuse light reflection in the transition zone is continually decreasing from the screen zone to the peripheral zone, in any direction joining the screen zone to the peripheral zone.

According to one variant, on each side of the layered element, the variation of the diffuse light reflection in the transition zone is decreasing from the screen zone to the peripheral zone, in any direction joining the screen zone to the peripheral zone, by at least one step for which the diffuse light reflection at any point of the step is strictly less than the diffuse light reflection at any point of the screen zone and of any preceding step closer to the screen zone. Of course, it is also possible to have, in each step, a continuous decrease of the variation of the diffuse light reflection in the direction from the screen zone to the peripheral zone.

According to another variant, in any direction joining the screen zone to the peripheral zone, the transition zone comprises at least two successive regions in the direction from the screen zone to the peripheral zone, where each region is formed by combining two parts comprising a first part closer to the screen zone and a second part closer to the peripheral zone, the mean diffuse light reflection of the first portion being strictly less than the mean diffuse light reflection of the second portion, the successive regions having a distribution more and more in favor of the first portion on approaching the peripheral zone. The invention is then implemented by reducing the density of the portions with diffuse reflection in the direction from the screen zone to the peripheral zone, which is translated into the presence of local maxima in the variation of the diffuse light reflection such that the curve passing through the value of diffuse light reflection at the junction of the transition zone with the screen zone and through these local maxima is decreasing.

According to a preferred feature, in any direction joining the screen zone to the peripheral zone, the variation of the blurring in transmission of the transition zone is less than or equal to 0.7%/mm.

According to another preferred feature, in any direction joining the screen zone to the peripheral zone, the variation of the clarity of the transition zone is less than or equal to 0.5%/mm.

In the context of the invention:
the blurring in transmission (Haze T) of a zone of a layered element, expressed in %, is measured with a hazemeter according to standard ASTM D 1003 for radiation incident on said zone of the layered element;
the clarity of a zone of a layered element, expressed in %, is measured with the Haze-Gard hazemeter from BYK.

According to the invention, the decrease of the variation of the diffuse light reflection in the transition zone, or of the curve passing through the or each local maximum of the variation of the diffuse light reflection in the transition zone, is obtained by varying at least one parameter from the mean square slope and the total light reflection of the middle layer of the transition zone, in any direction joining the screen zone to the peripheral zone.

In particular, in one embodiment of the invention, a first parameter from the mean square slope and the total light reflection of the middle layer of the transition zone is constant and equal to the corresponding parameter of the middle layer of the screen zone, whereas the second parameter from the mean square slope and the total light reflection of the middle layer of the transition zone is less than or equal to the corresponding parameter of the middle layer of the screen zone and has a variation decreasing from the screen zone to the peripheral zone, in any direction joining the screen zone to the peripheral zone.

In one embodiment, in any direction joining the screen zone to the peripheral zone, the variation of the second parameter from the mean square slope and the total light reflection of the middle layer of the transition zone is continually decreasing from the screen zone to the peripheral zone.

In another embodiment, in any direction joining the screen zone to the peripheral zone, the variation of the second parameter from the mean square slope and the total light reflection of the middle layer of the transition zone is decreasing from the screen zone to the peripheral zone by at least one step for which said second parameter at any point of the step is strictly less than the corresponding parameter at any point of the screen zone and of any preceding step closer to the screen zone. Of course, it is also possible to have a continuous decrease of the variation of said second parameter in each step in the direction from the screen zone to the peripheral zone.

Advantageously, when the parameter that varies is the mean square slope of the middle layer of the transition zone, the variation of the latter has a variation less than or equal to 3.5°/mm, preferably less than or equal to 3°/mm, more preferably less than or equal to 2°/mm.

Advantageously, when the parameter that varies is the total light reflection of the middle layer of the transition zone, the variation of the latter has a variation less than or equal to (20%)RL(ZE)/mm, where RL(ZE) is the mean total light reflection of the screen zone.

According to one embodiment, the middle layer of the transition zone has a refractive index equal to the refractive index of the middle layer of the screen zone, and the decrease of the variation of the total light reflection of the middle layer of the transition zone from the screen zone to the peripheral zone, in any direction joining the screen zone to the peripheral zone, is obtained by reducing the thickness of the middle layer from the screen zone to the peripheral zone.

According to another embodiment, the middle layer of the transition zone has a thickness equal to the thickness of the middle layer of the screen zone, and the decrease of the variation of the total light reflection of the middle layer of the transition zone from the screen zone to the peripheral zone, in any direction joining the screen zone to the peripheral zone, is obtained by varying the refractive index of the middle layer from the screen zone to the peripheral zone.

The parallelism of the textured contact surfaces in each screen zone and transition zone of the layered element means that, for each layer of the middle layer of the zone in question that is flanked by layers with a metallic or nonmetallic nature, different from its own or with refractive indices different from its own, the layer thickness is uniform perpendicularly to its surfaces of contact with the adjacent layers. This uniformity of thickness may be global over the entire extent of the texture, or local on portions of the texture. In particular, when the texture has variations of slope, the thickness between two consecutive textured contact surfaces may change, per portion, as a function of the slope of the texture, although the textured contact surfaces still remain parallel to one another. This case occurs in particular for a layer deposited by cathode sputtering, in particular by cathode sputtering assisted by a magnetic field (magnetron cathode sputtering), where the layer thickness decreases as the slope of the texture increases. Thus, locally, on each portion of texture having a given slope, the layer thickness remains constant, but the layer thickness is different between a first portion of texture having a first slope and a second portion of texture having a second slope different from the first slope.

Advantageously, in order to obtain parallelism of the textured contact surfaces within each screen zone and transition zone of the layered element, the or each layer making up the middle layer of the zone in question is a layer deposited by cathode sputtering. In fact, cathode sputtering, especially cathode sputtering assisted by a magnetic field (so-called magnetron cathode sputtering), guarantees that the surfaces delimiting the layer are parallel to one another, which is not the case with other deposition techniques such as evaporation or chemical vapor deposition (CVD), or else the sol-gel process. Now, parallelism of the textured contact surfaces within each screen zone and transition zone of the layered element is essential for obtaining specular transmission through the element.

The peripheral zone of the layered element may lack a middle layer interposed between the outer layers. As a variant, the peripheral zone of the layered element may comprise a middle layer interposed between the outer layers but, in contrast to the middle layers of the screen zone and transition zone, the middle layer of the peripheral zone is not textured, which guarantees specular reflection of radiation incident on the peripheral zone of the layered element from one or other of its outer layers.

According to one aspect of the invention, in each zone of the layered element comprising a middle layer, the middle layer comprises at least one thin layer consisting of a dielectric material with high refractive index, different than the refractive index of the outer layers, such as $Si_3N_4$, $SnO_2$, ZnO, AlN, NbO, NbN, $TiO_2$, or consisting of a dielectric material with low refractive index, different than the refractive index of the outer layers, such as $SiO_2$, $Al_2O_3$, $MgF_2$, $AlF_3$. The middle layer may also comprise at least one thin metallic layer, in particular a thin layer of silver, gold, titanium, niobium, silicon, aluminum, nickel-chromium alloy (NiCr), stainless steel, or alloys thereof. In the sense of the invention, a thin layer is a layer with a thickness of less than 1 micrometer.

Advantageously, in each zone of the layered element comprising a middle layer, the chemical composition of the middle layer may be adjusted to confer additional properties on the layered element, for example thermal properties, of the solar control and/or low emissivity type. Thus, in one embodiment, the middle layer is a stack of thin layers comprising an alternation of "n" metallic functional layers, in particular of functional layers based on silver or metal alloy containing silver, and of "(n+1)" antireflective coatings, with n 1, where each metallic functional layer is arranged between two antireflective coatings.

In a known manner, such a stack with a metallic functional layer has properties of reflection in the range of solar radiation and/or in the range of long-wave infrared radiation. In a stack like this, the metallic functional layer or layers essentially determine the thermal performance, whereas the antireflective coatings around them act by interference on the visual appearance. In fact, although the metallic functional layers make it possible to obtain desired thermal performance even at a small geometric thickness, of the order of 10 nm for each metallic functional layer, they strongly oppose the passage of radiation in the visible wavelength range. Therefore antireflective coatings on either side of each metallic functional layer are necessary to ensure good light transmission in the visible region. In practice, it is the complete stack of the middle layer, comprising the thin metallic layers and the antireflective coatings, that is optimized optically. Advantageously, optical optimization may be performed on the complete stack of the layered element or of the glazing, i.e. including the outer layers positioned on either side of the middle layer and any additional layers.

The layered element obtained thus combines optical properties, namely properties of specular transmission and of diffuse reflection of radiation incident on the screen and transition zones of the layered element, and thermal properties, namely solar control and/or low emissivity properties. A layered element of this kind may be used for glazing for solar protection and/or heat insulation, in particular of vehicles or buildings.

According to one aspect of the invention, in each screen zone and transition zone of the layered element, the texture of each contact surface between two adjacent layers, one of which is a transparent layer, in particular dielectric, and the other is a metallic layer, or which are two transparent layers, in particular dielectric, with different refractive indices, is formed by a plurality of patterns that are sunken or raised relative to a general plane of the contact surface. In the context of the invention, in each screen zone and transition zone of the layered element, the mean square slope Rdq of the middle layer is strictly greater than 0.2°. Preferably, in the screen zone of the layered element, the mean square slope Rdq of the middle layer is between 0.5° and 30°, preferably between 2° and 20°, more preferably between 2° and 10°. Preferably, in the transition zone of the layered element, the mean square slope Rdq of the middle layer is between 0.5° and 30°, preferably between 0.5° and 20°, more preferably between 0.5° and 10°.

In practice, when the variation of the diffuse light reflection between the different zones of the layered element is obtained by varying the roughness profile of the middle layer for given constant thickness and chemical composition of the middle layer, the roughness profile of the middle layer of each zone of the layered element may be obtained by depositing the or each layer of the middle layer with constant thickness and composition conformably on a substrate having suitable texturing, for example texturing with a mean square slope Rdq less than or equal to 0.2° to form the peripheral zone, texturing with a mean square slope Rdq of the order of 2° to 10° to form the screen zone, and texturing with a mean square slope Rdq decreasing from the screen zone to the peripheral zone to form the transition zone. This suitable texturing of a substrate may be obtained by any known method of texturing, for example by embossing the substrate surface, by abrasion, by sand blasting, by chemical treatment or by etching, using masks for example to adjust the roughness profile of each part of the substrate surface.

As a variant, when the variation of the diffuse light reflection between the different zones of the layered element is obtained by varying the thickness of the middle layer for a given constant chemical composition and roughness profile of the middle layer, the thickness profile of the middle layer of each zone of the layered element may be obtained by depositing the or each layer of the middle layer of constant composition conformably on a substrate having constant roughness, by modulating the deposition thickness.

Similarly, when the variation of the diffuse light reflection between the different zones of the layered element is obtained by varying the refractive index of the middle layer for a given constant thickness and roughness profile of the middle layer, the profile of chemical composition of the middle layer of each zone of the layered element may be obtained by depositing the or each layer of the middle layer with constant thickness conformably on a substrate having constant roughness, with modulation of the composition of the layer during deposition.

In one embodiment of the invention, one of the two outer layers of the layered element is a textured outer layer comprising a rigid or flexible substrate, in particular made of glass or of organic polymer material, a main surface of which is textured. The texturing of one of the main surfaces of the substrate may be obtained by any known method of texturing, for example by embossing the surface of the substrate heated beforehand to a temperature at which it can be deformed, in particular by rolling using a roller whose surface has texturing complementary to the texturing to be formed on the substrate; by abrasion by means of particles or abrasive surfaces, in particular by sand blasting; by chemical treatment, in particular treatment with acid in the case of a glass substrate; by molding, in particular injection molding in the case of a substrate of thermoplastic polymer; or by etching. As a variant, the texturing of the main surface of the substrate may be obtained by depositing a glass frit or an enamelled layer.

Examples of textured glass substrates usable as the textured outer layer of the layered element comprise: the glass substrates marketed by the company Saint-Gobain Glass in the SGG Satinovo range, which have a texture obtained by acid etching on one of their main surfaces; the glass substrates marketed by the company Berliner Glas in the BG-Nonflex range, which have a texture obtained by chemical treatment on one of their main surfaces; the glass substrates marketed by the company AGC in the Matelux Light range, which have a texture obtained by acid etching on one of their main surfaces; the high-index glass substrates textured by sand blasting such as flint glass for example marketed by the company Schott under the references SF6 ($n=1.81$ to 550 nm), 7SF57 ($n=1.85$ to 550 nm), N-SF66 ($n=1.92$ to 550 nm), P-SF68 ($n=2.00$ to 550 nm).

In the case of a textured outer layer formed by a textured substrate made of organic polymer material, examples of suitable materials comprise, in particular, polyesters such as polyethylene terephthalate (PET), polybutylene terephthalate (PBT), polyethylene naphthalate (PEN); polyacrylates such as polymethyl methacrylate (PMMA); polycarbonates; polyurethanes; polyamides; polyimides; fluorinated polymers such as ethylene tetrafluoroethylene (ETFE), polyvinylidene fluoride (PVDF), polychlorotrifluoroethylene (PCTFE), ethylene chlorotrifluoroethylene (ECTFE), fluorinated ethylene-propylene copolymers (FEP); photocrosslinkable and/or photopolymerizable resins, such as the resins thiol-ene, polyurethane, urethane-acrylate, polyester-acrylate; polythiourethanes. These polymers generally have a range of refractive index at 550 nm from 1.30 to 1.70. However, it is interesting to note that some of these polymers, and in particular the polymers comprising sulfur such as the polythiourethanes, may have higher refractive indices at 550 nm, which may be up to 1.74.

In another embodiment of the invention, one of the two outer layers of the layered element is a textured outer layer formed by a conformable layer, a main surface of which is textured and is attached by its other main surface on a rigid or flexible substrate. It may in particular be a thermoformable layer or a layer of photocrosslinkable and/or photopolymerizable material. In this case, a very suitable method for texturing one of the main surfaces of the conformable layer is, in particular, embossing. Preferably, the photocrosslinkable and/or photopolymerizable material is in liquid form at room temperature and gives, when it has been irradiated and photocrosslinked and/or photopolymerized, a transparent solid free from bubbles or any other irregularity. It may in particular be a resin such as those usually employed as adhesives, glues or surface coatings. These resins are generally based on monomers/comonomers/prepolymers of the epoxy, epoxysilane, acrylate, methacrylate, acrylic acid, and methacrylic acid type. We may mention for example the resins thiol-ene, polyurethane, urethane-acrylate, polyester-acrylate. Instead of a resin, it may be a photocrosslinkable aqueous gel, such as a polyacrylamide gel.

When one of the two outer layers of the layered element is a textured outer layer having a textured main surface and its other main surface is smooth, the middle layer is advantageously formed:
  either by a single layer of metallic material or of transparent material, in particular dielectric, with a refractive index different from that of the textured outer layer, deposited conformably on the textured main surface of the textured outer layer,
  or by a stack of layers, which comprises at least one layer of metallic material or of transparent material, in particular dielectric, with a refractive index different from that of the textured outer layer, deposited conformably, successively on the textured main surface of the textured outer layer.

According to the invention, it is considered that the deposition of the middle layer, or the successive deposition of the layers of the middle layer, on the textured main surface of the textured outer layer is carried out conformably if, following deposition, the surface of the or each layer of the middle layer is textured and parallel to the textured main surface of the textured outer layer. According to an advantageous feature, conformable deposition of the middle layer, or successive conformable deposition of the layers of the middle layer, on the textured main surface of the textured outer layer is carried out by cathode sputtering, in particular assisted by a magnetic field (magnetron cathode sputtering).

Other techniques of conformable deposition are also conceivable, such as evaporation techniques, in particular for depositing metallic layers.

According to one aspect of the invention, the other outer layer of the layered element, i.e. the outer layer located on the other side of the middle layer relative to the textured outer layer, comprises a layer of hardenable material with a refractive index approximately equal to that of the textured outer layer, deposited on the textured main surface of the middle layer opposite to the textured outer layer, initially being in a viscous, liquid or pasty state suitable for forming operations.

The layer deposited initially in a viscous, liquid or pasty state may be, in particular, a layer for planarization of the surface of the layered element. As a variant, the layer deposited initially in a viscous, liquid or pasty state may be a layer ensuring integration between, on the one hand, the textured outer layer provided with the middle layer and, on the other hand, a counter-substrate.

The layer deposited initially in a viscous, liquid or pasty state may be a layer of photocrosslinkable and/or photopolymerizable material. Preferably, this photocrosslinkable and/or photopolymerizable material is in liquid form at room temperature and gives, when it has been irradiated and photocrosslinked and/or photopolymerized, a transparent solid free from bubbles or any other irregularity. It may in particular be a resin such as those usually employed as adhesives, glues or surface coatings. These resins are generally based on monomers/comonomers/prepolymers of the epoxy, epoxysilane, acrylate, methacrylate, acrylic acid, and methacrylic acid type. We may mention for example the resins thiol-ene, polyurethane, urethane-acrylate, polyesteracrylate. Instead of a resin, it may be a photocrosslinkable aqueous gel, such as a polyacrylamide gel.

As a variant, the layer deposited initially in a viscous, liquid or pasty state may be a layer deposited by a sol-gel process, in particular a sol-gel layer comprising an organic/inorganic hybrid matrix based on silica. A sol-gel layer of this kind is particularly advantageous as it offers the possibility of accurately adjusting the value of its refractive index, so that it is as close as possible to that of the textured outer layer. According to the invention, the agreement of index or difference of index between the two outer layers of the layered element corresponds to the absolute value of the difference between the refractive indices at 550 nm of their constituent dielectric materials. The smaller the difference in index, the clearer the vision through the layered element. In particular, excellent vision is obtained with an agreement of index less than or equal to 0.050, preferably less than or equal to 0.030 and better still, less than or equal to 0.015.

According to one aspect of the invention, at least one of the two outer layers of the layered element is an interposed lamella based on polymer material, in particular thermoformable or pressure-sensitive, i.e. the type of lamella that is used as an interlayer in laminated glazing. It may, in particular, be at least one lamella based on polyvinyl butyral (PVB), ethylene-vinyl acetate (EVA), polyurethane (PU), polyethylene terephthalate (PET), or polyvinyl chloride (PVC). This layer based on polymer material may play the role of a lamination interlayer that may be laminated or calendered on a substrate as an additional layer, for example clear or extra-clear glass.

According to one aspect of the invention, the layered element may be a flexible film. Said flexible film is advantageously provided, on one of its outer main surfaces, with a layer of adhesive covered with a protective strip that is intended to be removed for gluing the film. The layered element in the form of flexible film can then be attached by gluing on an existing surface, for example a surface of transparent glazing, in order to endow this surface with properties of diffuse reflection at the level of each screen zone and transition zone, while maintaining properties of specular transmission through the glazing. The glazing on which the layered element in the form of flexible film is attached may be flat or curved glazing.

The invention also relates to transparent glazing comprising a layered element as described above.

In one embodiment, the transparent glazing further comprises at least one additional layer positioned against the layered element, preferably selected from:
  transparent substrates selected from polymers, glasses or ceramics comprising two smooth main surfaces,
  hardenable materials initially in a viscous, liquid or pasty state suitable for forming operations, in particular a sol-gel layer,
  interposed lamellae based on polymer material, in particular thermoformable or pressure-sensitive.

Advantageously, said transparent glazing incorporating the layered element comprises at least one antireflective coating at the interface between the air and the material constituting the layer forming an outer main surface of the glazing that is intended to be opposite a projector during projection of images on the screen zone. Addition of an antireflective coating can reduce the multiple reflections inside the layered element and thus improve the quality of the projected images.

The antireflective coating provided on at least one of the outer main surfaces of the transparent glazing may be of any type for reducing reflection of radiation at the interface between the air and the layer forming the outer main surface. It may, in particular, be a layer with a refractive index between the refractive index of air and the refractive index of the layer forming the outer main surface, such as a layer deposited on the surface of the layer forming the outer main surface by a vacuum technique or a porous layer of the sol-gel type, or, in the case when the layer forming the outer main surface is made of glass, a hollowed surface portion of this glass layer obtained by acid treatment of the "etching" type. As a variant, the antireflective coating may be formed by a stack of thin layers having alternating lower and higher refractive indices, performing the role of an interference filter at the interface between the air and the layer forming the outer main surface, or by a stack of thin layers having a continuous or stepped gradient of refractive indices between the refractive index of air and that of the layer forming the outer main surface.

The smooth outer main surfaces of the layered element and of the transparent glazing may be flat or curved. In particular, the layered element may be employed in curved glazing, for example for buildings or vehicles, in particular automobiles. According to one aspect of the invention, the smooth outer main surfaces of the layered element may not be parallel to one another, for example in the case of a wedge-shaped layered element intended to be used in a "Head-Up Display" (HUD) system, in order to avoid double imaging. In other applications, the smooth outer main surfaces of the layered element are preferably parallel to one another, which helps to limit light scattering for radiation passing through the layered element, and therefore improve the clarity of vision through the layered element.

BRIEF DESCRIPTION OF THE FIGURES

The features and advantages of the invention will become clear in the following description of several embodiments of a layered element and of transparent glazing according to the invention, given only as an example and made with reference to the appended drawings, in which:

FIG. 4b is a curve showing the variation of the diffuse light reflection in the different zones of the layered element of the first embodiment according to the section in FIG. 4a;

FIG. 5b is a curve showing the variation of the diffuse light reflection in the different zones of the layered element of the second embodiment according to the section in FIG. 5a;

FIG. 7b is a curve showing the variation of the diffuse light reflection in the different zones of the layered element of the third or fourth embodiment according to the section in FIG. 7a;

FIG. 8b is a curve showing the variation of the diffuse light reflection in the different zones of the layered element of the fifth embodiment according to the section in FIG. 8a;

DETAILED DESCRIPTION

Unless stated otherwise, one and the same element appearing in different figures has a unique reference. For clarity of the drawings, the relative thicknesses of the various layers and the relative widths of the various zones in FIGS. 1 to 10b have not been rigorously respected. Moreover, the possible variation of thickness of the or each layer making up the middle layer as a function of the slope of the texture has not been shown in the figures, it being understood that this possible variation of thickness does not affect the parallelism of the textured contact surfaces. In fact, for each given slope of the texture, the textured contact surfaces are parallel to one another.

Figure 1:
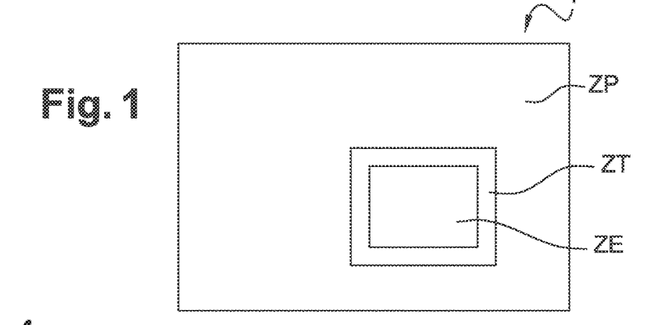
FIG. 1 is a schematic top view of transparent glazing incorporating a layered element according to the invention.

FIG. 1 shows a schematic top view of transparent glazing 1 incorporating a layered element according to the invention, which comprises a screen zone ZE, a peripheral zone ZP, and a transition zone ZT between the screen zone ZE and the peripheral zone ZP. Two possible structures for the glazing 1 are shown, as nonlimiting examples, in FIGS. 2 and 3. Note that FIGS. 2 and 3 illustrate the structure of the glazing 1 only at the level of the screen zone ZE, it being understood that the structure of the glazing 1 is similar at the level of the transition zone and of the peripheral zone, the textured middle layer 3E of the screen zone simply being replaced, in the transition zone ZT, by the textured middle layer 3T of the transition zone and, in the peripheral zone ZP, either by absence of a middle layer or by an untextured middle layer 3P of the peripheral zone.

Figure 2:
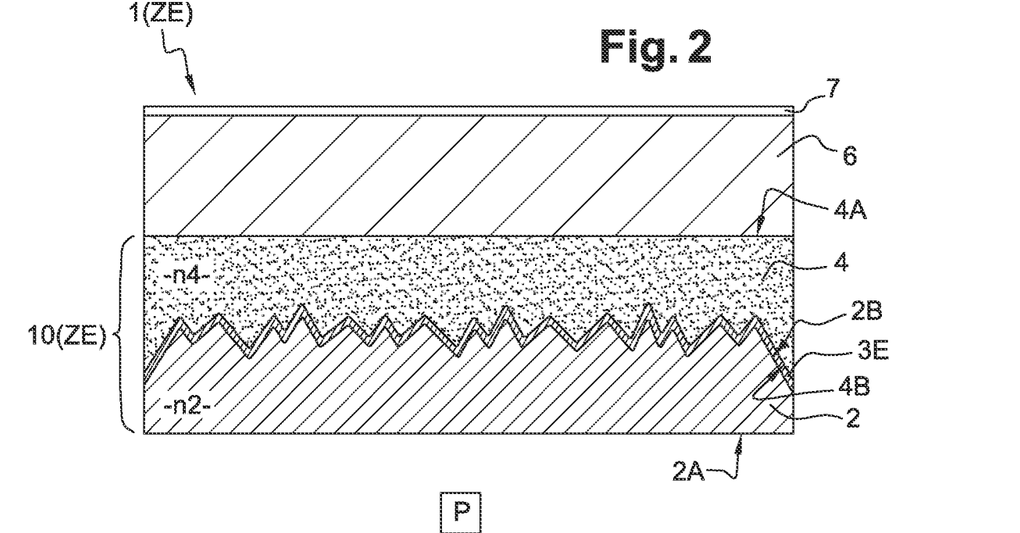
FIG. 2 is a schematic cross section of the transparent glazing in FIG. 1 at the level of the screen zone of the layered element for a first variant of the structure of the glazing.
Figure 3:
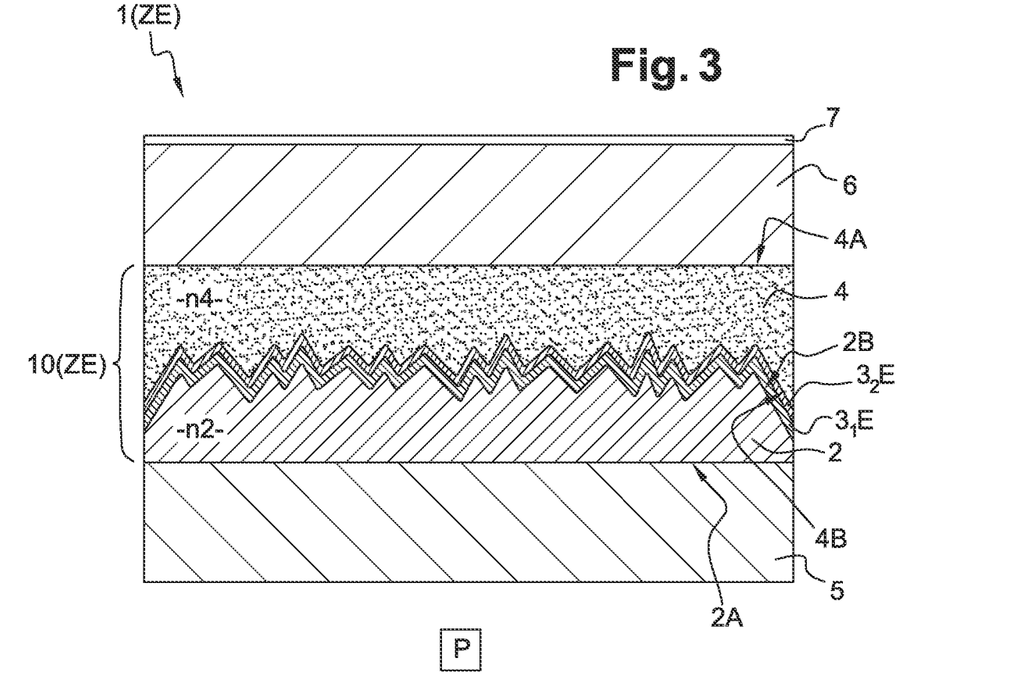
FIG. 3 is a schematic cross section of the transparent glazing in FIG. 1 at the level of the screen zone of the layered element for a second variant of the structure of the glazing.

According to the invention, as illustrated in FIGS. 2 and 3, the glazing 1 comprises a layered element 10 comprising two outer layers 2 and 4, which are made up of transparent dielectric materials having approximately the same refractive index n2, n4. Each outer layer 2 or 4 has a smooth main surface, 2A or 4A respectively, directed toward the exterior of the layered element, and a textured main surface, 2B or 4B respectively, directed toward the interior of the layered element.

The textures of the internal surfaces 2B and 4B are complementary to one another. The textured surfaces 2B and 4B are positioned facing one another, in a configuration in which their textures are strictly parallel to one another. The layered element 10 also comprises a middle layer 3E interposed in contact between the textured surfaces 2B and 4B.

Figure 10A:
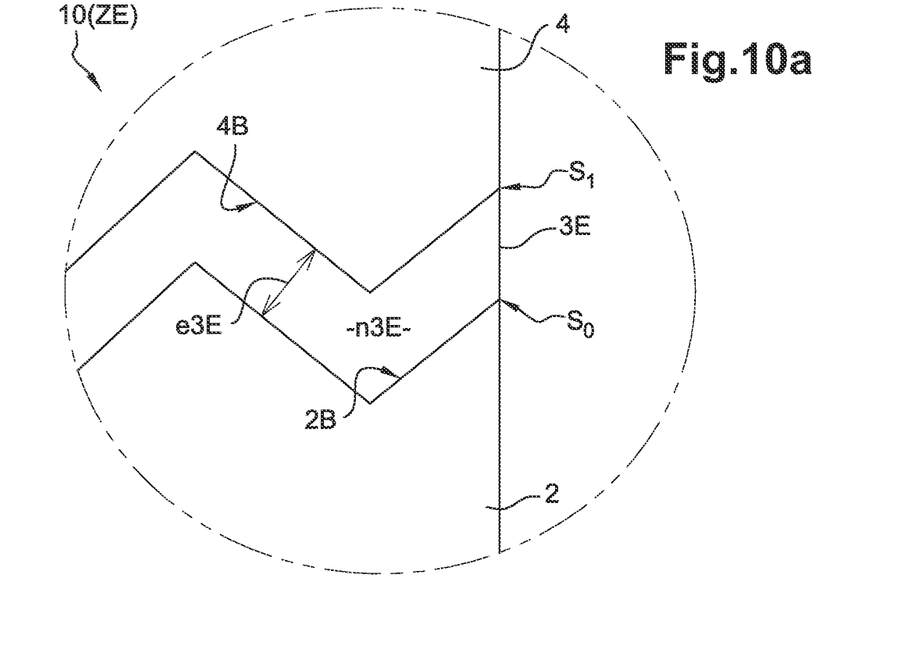
FIG. 10a is an enlarged view of a detail of the screen zone of the layered element in one of FIGS. 4 to 9, according to a first alternative.
Figure 10B:
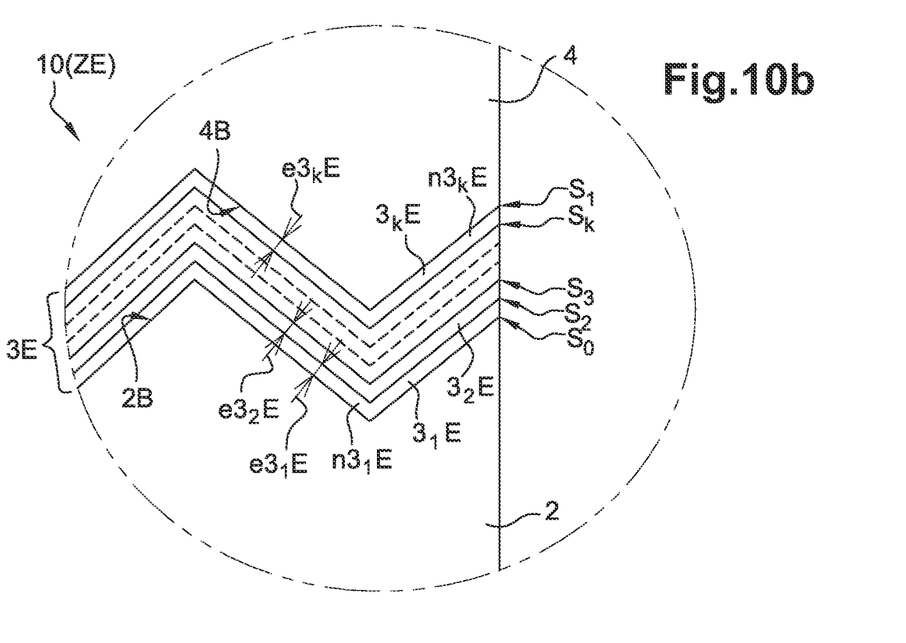
FIG. 10b is an enlarged view of a detail of the screen zone of the layered element in one of FIGS. 4 to 9, according to a second alternative.

FIG. 10a shows a variant embodiment according to which the middle layer 3E is single-layered and consists of a transparent material that is either metallic, or dielectric with a refractive index n3 different from that of the outer layers 2 and 4. FIG. 10b shows a variant embodiment according to which the middle layer 3E is formed by a transparent stack of several layers $3_1E, 3_2E, \ldots, 3_kE$, where at least one of the layers $3_1E$ to $3_kE$ is either a metallic layer, or a dielectric layer with a refractive index different from that of the outer layers 2 and 4. Preferably, at least each of the two layers $3_1E$ and $3_kE$ located at the ends of the stack is a metallic layer or a dielectric layer with a refractive index n31E or n3kE different from that of the outer layers 2 and 4.

The structures, single-layered or multilayer, illustrated in FIGS. 10a and 10b for the middle layer 3E of the screen zone ZE may of course also be used for the middle layer 3T of the transition zone ZT and the middle layer 3P of the peripheral zone ZP. Hereinafter, all the references followed by the letter "E" are transposable to the middle layers of the transition zone ZT and of the peripheral zone ZP by replacing the letter "E" with the letter "T" or "P".

In FIGS. 10a and 10b, the contact surface between the outer layer 2 and the middle layer 3E is designated $S_0$, and the contact surface between the middle layer 3E and the outer layer 4 is designated $S_1$. Moreover, in FIG. 10b, the internal contact surfaces of the middle layer 3E are designated $S_2$ to $S_k$ successively, starting from the contact surface closest to the surface $S_0$.

In the variant in FIG. 10a, owing to the arrangement of the middle layer 3E in contact between the textured surfaces 2B and 4B, which are parallel to one another, the contact surface $S_0$ between the outer layer 2 and the middle layer 3E is textured and parallel to the contact surface $S_1$ between the middle layer 3E and the outer layer 4. In other words, the middle layer 3E is a textured layer having a uniform thickness e3E, taken perpendicularly to the contact surfaces $S_0$ and $S_1$.

In the variant in FIG. 10b, each contact surface $S_2, \ldots, S_k$ between two adjacent layers of the stack making up the middle layer 3E is textured and strictly parallel to the contact surfaces $S_0$ and $S_1$ between the outer layers 2, 4 and the middle layer 3E. Thus, all the contact surfaces $S_0, S_1, \ldots,$ $S_k$ between adjacent layers of the layered element 10 that are either of different, dielectric or metallic, natures or made of dielectric materials with different refractive indices, are textured and parallel to one another. In particular, each layer $3_1E, 3_2E, \ldots 3_kE$ of the stack making up the middle layer 3 has a uniform thickness $e3_1E, e3_2E, \ldots, e3_kE$, taken perpendicularly to the contact surfaces $S_0, S_1, \ldots, S_k$.

According to one aspect of the invention, the thickness e3E or $e3_1E, e3_2E, \ldots, e3_kE$ of the or each layer making up the middle layer 3E is less than the average height of the patterns of each contact textured surface $S_0, S_1$ or $S_0, S_1, \ldots, S_k$ of the layered element 10. This condition is important for increasing the probability that the entry interface of radiation into a layer of the middle layer 3E and the exit interface of the radiation out of this layer are parallel, and thus increase the percentage of specular transmission of the radiation through the layered element 10. For the sake of visibility of the various layers, this condition has not been strictly respected in the figures. In practice, when the middle layer 3E is a thin layer or a stack of thin layers, the thickness e3E or $e3_1E, e3_2E, \ldots, e3_kE$ of each layer of the middle layer 3E is of the order of, or less than, 1/10 of the average height of the patterns of each textured contact surface of the layered element.

In the first example of glazing 1 shown in FIG. 2, the first outer layer 2 is a textured substrate of clear or extra-clear glass at least partially textured, for example glass of the SGG Satinovo type marketed by Saint-Gobain Glass, and the second outer layer 4 is formed by an interposed lamella, for example of PVB, which has approximately the same refractive index as the substrate 2 and conforms to the texture of the textured surface of the middle layer 3E. The interposed lamella 4 is calendered by its outside surface 4A to a flat substrate 6 of clear or extra-clear glass, for example glass of the SGG Planilux type marketed by Saint-Gobain Glass. Moreover, the glazing 1 comprises an antireflective coating 7 on the outer main surface of the flat substrate 6, which is intended to be opposite relative to a projector P during projection of images on the screen zone ZE. The presence of the antireflective coating 7 makes it possible to reduce the multiple reflections inside the layered element 10 and thus improve the quality of the projected images.

In the second example of glazing 1 shown in FIG. 3, the first outer layer 2 is not textured glass, but an interposed lamella, for example of PVB, which has approximately the same refractive index as the interposed lamella 4. In this second example, the middle layer 3E comprises a flexible film $3_1E$, for example a film of poly(methyl methacrylate) (PMMA) having a thickness of the order of 50 to 250 μm, on which a thin layer $3_2E$ of dielectric material or of metallic material has been deposited, for example a thin layer of $TiO_2$ having a thickness of the order of 50 to 75 nm. The assembly of the flexible film $3_1E$ and the thin layer $3_2E$ is formed as undulations or an accordion shape to create the textured middle layer 3E, which is then sandwiched between the interposed lamellae 2 and 4, in such a way that the contact surfaces between the layers 2, $3_1E$, $3_2E$ and 4 remain parallel to one another. Each of the interposed lamellae 2, 4 is calendered by its outside surface 2A, 4A to a flat substrate 5 or 6 of clear or extra-clear glass, for example glass of the SGG Planilux type marketed by Saint-Gobain Glass. Moreover, as in the example in FIG. 2, the glazing 1 comprises an antireflective coating 7 on the outer main surface of the flat substrate 6, which is intended to be opposite relative to a projector P during projection of images on the screen zone ZE.

FIGS. 4 to 9 illustrate several embodiments of the layered element 10 according to the invention that can be incorporated in glazing 1. In each embodiment, the layered element 10 is designed to have a uniform overall visual appearance from one or other of its outer layers 2, 4, owing to the transition zone ZT, which allows integration of the screen zone ZE in the peripheral zone ZP without pronounced visual delimitation between the zones. For this purpose, on each side of the layered element 10, the diffuse light reflection $RL_{diff}(ZT)$ at any point of the transition zone ZT is less than or equal to the diffuse light reflection $RL_{diff}(ZE)$ at any point of the screen zone ZE and the variation of the diffuse light reflection $RL_{diff}(ZT)$ in the transition zone ZT from the screen zone ZE to the peripheral zone ZP, in any direction joining the screen zone ZE to the peripheral zone ZP, is decreasing, or is such that the curve passing through the value of diffuse light reflection at the junction of the transition zone ZT with the screen zone ZE and through the or each local maximum of the variation $RL_{diff}(ZT)$ is decreasing.

Preferably, in each embodiment, in order to obtain a uniform visual appearance regardless of the lighting conditions, the layered element 10 is designed so that, on each side of the layered element:

in any direction joining the screen zone ZE to the peripheral zone ZP, the variation of the diffuse light reflection $RL_{diff}(ZT)$ in the transition zone ZT is less than or equal to (20%)RL(ZE)/mm, where RL(ZE) is the mean total light reflection of the screen zone ZE;

in any direction joining the screen zone ZE to the peripheral zone ZP, the variation of the blurring in transmission Haze T(ZT) of the transition zone ZT is less than or equal to 0.7%/mm;

in any direction joining the screen zone ZE to the peripheral zone ZP, the variation of the clarity C(ZT) of the transition zone ZT is less than or equal to 0.5%/mm.

Figure 4A:
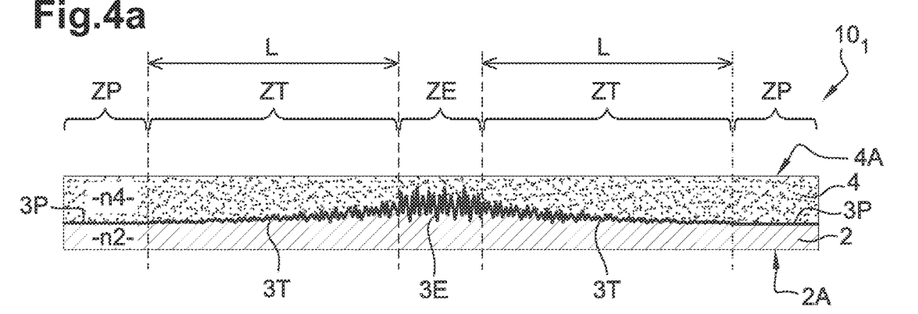
FIG. 4a is a schematic partial cross section of a layered element according to a first embodiment of the invention.
Figure 4B:
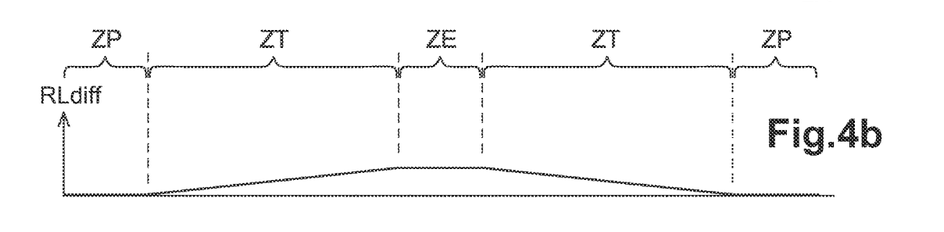

In the first embodiment of a layered element 101 shown in FIGS. 4a and 4b, the decrease in the variation of the diffuse light reflection in the transition zone ZT going from the screen zone ZE to the peripheral zone ZP is obtained by continuous variation of the roughness profile of the middle layer 3T of the transition zone ZT, in the sense of a decrease of the mean square slope Rdq(ZT) from the screen zone ZE to the peripheral zone ZP, whereas the middle layers 3E, 3T, 3P all have an identical thickness and an identical chemical composition.

As an example, referring to FIG. 4a:

in the screen zone ZE, the middle layer 3E is textured, with a mean square slope Rdq(ZE) of the order of 5°;

in the peripheral zone ZP, the middle layer 3P is smooth, with a mean square slope Rdq(ZP) of less than 0.2°;

in the transition zone ZT, which has a width L of 2.5 mm, the middle layer 3T is textured with a mean square slope Rdq(ZT) that decreases continuously, from the value of the mean square slope Rdq(ZE) of 5° at the junction with the screen zone ZE, to a value less than 0.2° at the junction with the peripheral zone ZP.

Figure 5A:
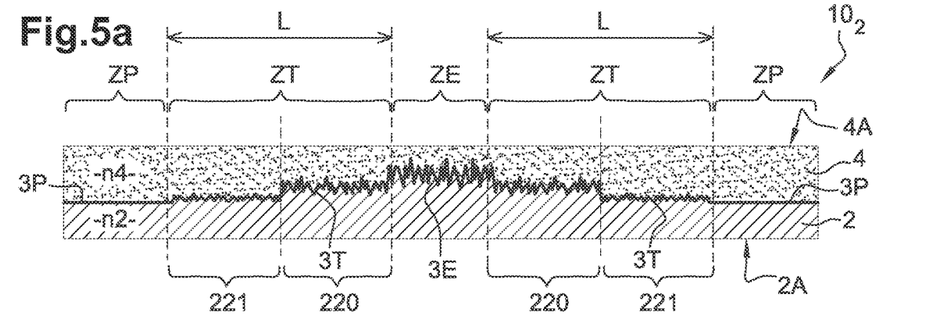
FIG. 5a is a schematic partial cross section of a layered element according to a second embodiment of the invention.
Figure 5B:
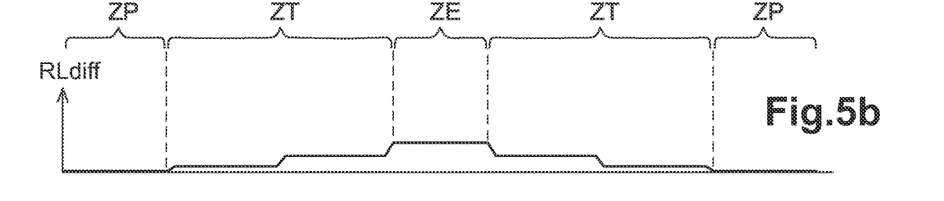

In the second embodiment of a layered element 102 shown in FIGS. 5a and 5b, the decrease in the variation of the diffuse light reflection in the transition zone ZT going from the screen zone ZE to the peripheral zone ZP is obtained by stepped variation of the roughness profile of the middle layer 3T of the transition zone ZT, in the sense of a decrease of the mean square slope Rdq(ZT) from the screen zone ZE to the peripheral zone ZP, whereas the middle layers 3E, 3T, 3P all have an identical thickness and an identical chemical composition.

As an example, referring to FIG. 5a:
in the screen zone ZE, the middle layer 3E is textured, with a mean square slope Rdq(ZE) of the order of 5°;
in the peripheral zone ZP, the middle layer 3P is smooth, with a mean square slope Rdq(ZP) of less than 0.2°;
in the transition zone ZT, which has a width L of 5 mm, the middle layer 3T is textured with a mean square slope Rdq(ZT) that decreases in two successive steps 220, 221 such that: for step 220 closest to the screen zone ZE, the middle layer 3T is textured with a mean square slope Rdq(ZT) of the order of 3°; for step 221 closest to the peripheral zone ZP, the middle layer 3T is textured with a mean square slope Rdq(ZT) of the order of 1°.

Figure 6A:
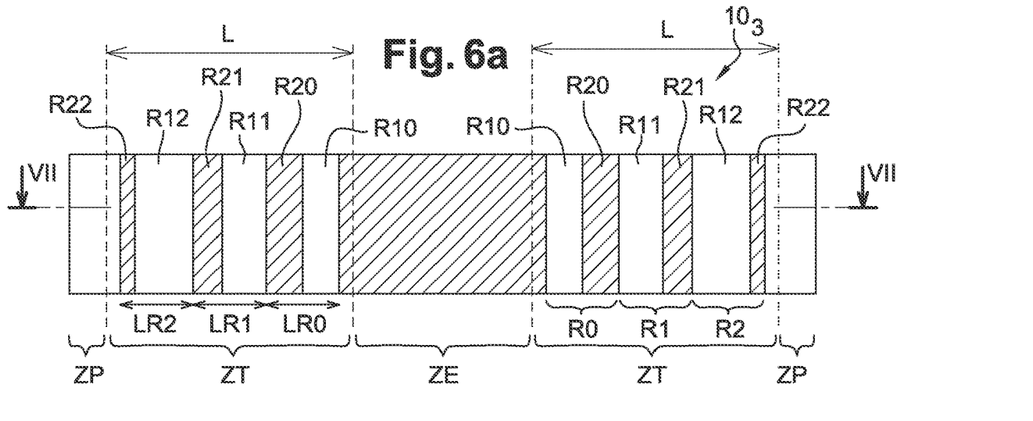
FIG. 6a is a schematic partial top view of a layered element according to a third embodiment of the invention.
Figure 6B:
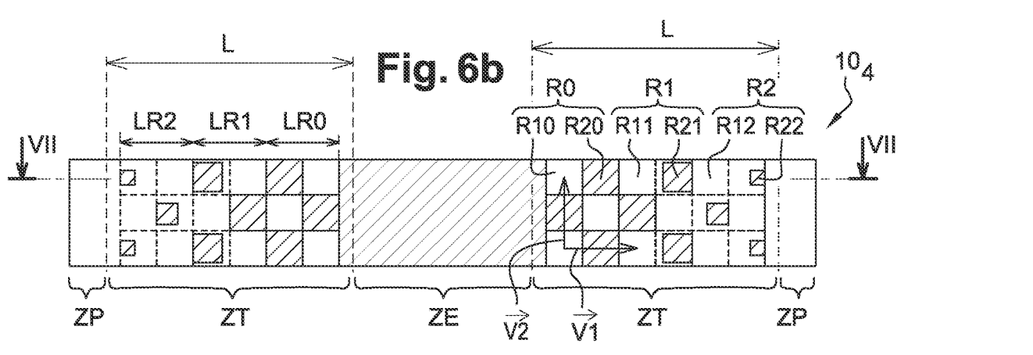
FIG. 6b is a schematic partial top view of a layered element according to a fourth embodiment of the invention.

In the third and fourth embodiments shown in FIGS. 6a and 6b, the invention is implemented by reducing the density of textured regions or portions with diffuse reflection from the screen zone ZE to the peripheral zone ZP, whereas the middle layers 3E, 3T, 3P all have an identical thickness and an identical chemical composition.

For the layered element 103 according to the third embodiment shown in FIG. 6a, which corresponds to a reduction of the density of portions with diffuse reflection by alternation of smooth bands and textured bands:
in the screen zone ZE, the middle layer 3E is textured, with a mean square slope Rdq(ZE) of the order of 5°;
in the peripheral zone ZP, the middle layer 3P is smooth, with a mean square slope Rdq(ZP) of less than 0.2°;
in the transition zone ZT, which has a width L of 6 mm, the roughness profile of the middle layer 3T is discontinuous in the direction joining the screen zone ZE to the peripheral zone ZP.

More precisely, the transition zone ZT comprises three successive regions R0, R1, R2 going from the screen zone ZE to the peripheral zone ZP, where each region is formed by combining two bands comprising in each case a smooth band R10, R11, R12 closer to the screen zone ZE, where the middle layer 3T has the same roughness profile as the peripheral zone ZP, i.e. a mean square slope Rdq less than 0.2°, and a textured band R20, R21, R22, closer to the peripheral zone ZP, where the middle layer 3T has the same roughness profile as the screen zone ZE, i.e. a mean square slope Rdq of the order of 5°, width LR0, LR1, LR2 of the successive regions R0, R1, R2 being constant with a distribution more and more in favor of the smooth band on approaching the peripheral zone ZP. In other words, in the direction from the screen zone ZE to the peripheral zone ZP, the smooth bands (white in FIG. 6a) are wider and wider whereas the textured bands (hatched in FIG. 6a) are narrower and narrower.

For the layered element 104 according to the fourth embodiment shown in FIG. 6b, which corresponds to a reduction of the density of portions with diffuse reflection by paving with alternation of smooth blocks and textured blocks:
in the screen zone ZE, the middle layer 3E is textured, with a mean square slope Rdq(ZE) of the order of 5°.
in the peripheral zone ZP, the middle layer 3P is smooth, with a mean square slope Rdq(ZP) of less than 0.2°.
in the transition zone ZT, which has a width L of the order of 6 mm, the roughness profile of the middle layer 3T is discontinuous both in a first direction that is the direction joining the screen zone ZE to the peripheral zone ZP and in a second direction orthogonal to the first direction while being parallel to the middle plane of the element 104.

More precisely, the transition zone ZT comprises regular paving of polygons, which are squares in the example shown in FIG. 6b, the paving being described by a first translation vector V1 in the first direction and a second translation vector V2 in the second direction. As in the third embodiment, we may define three successive regions R0, R1, R2 going from the screen zone ZE to the peripheral zone ZP, where each region comprises an alternation of smooth squares R10, R11, R12, where the middle layer 3T has the same roughness profile as the peripheral zone ZP, i.e. a mean square slope Rdq less than 0.2°, and of textured squares R20, R21, R22, where the middle layer 3T has the same roughness profile as the screen zone ZE, i.e. a mean square slope Rdq of the order of 5°, the width LR0, LR1, LR2 of the successive regions R0, R1, R2 being constant with a distribution more and more in favor of the smooth squares on approaching the peripheral zone ZP.

Figure 7A:
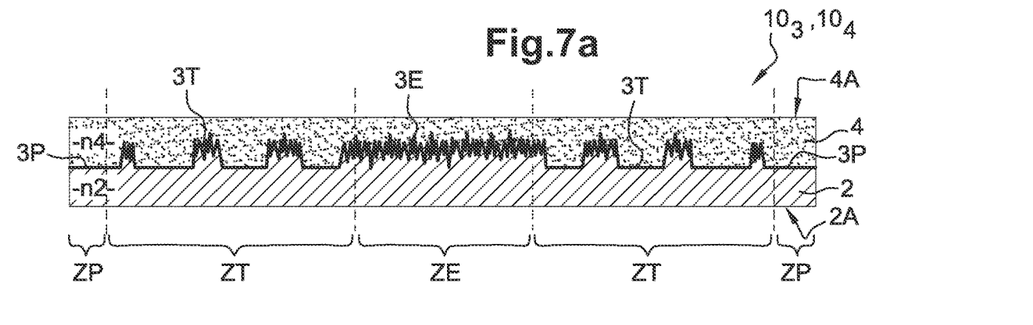
FIG. 7a is a cross section along the line VII-VII in FIG. 6a or FIG. 6b.
Figure 7B:
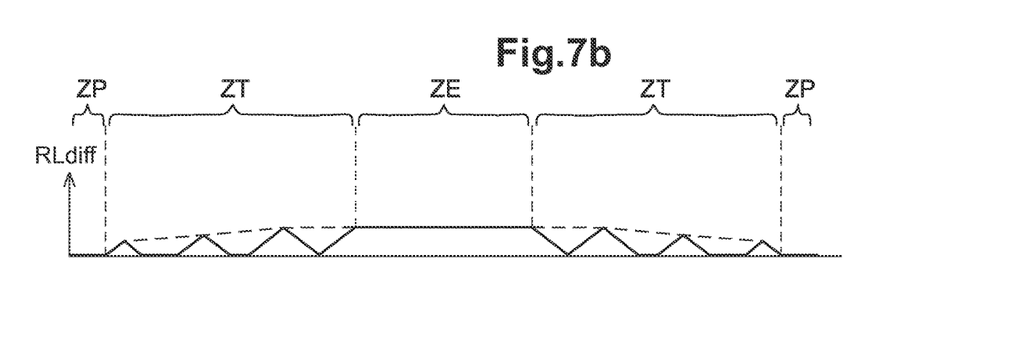

The reduction in the density of textured regions or portions with diffuse reflection from the screen zone ZE to the peripheral zone ZP in the third and fourth embodiments is clearly visible on the section in FIG. 7a, which shows the roughness profile of the middle layer 3E, 3T, 3P in each zone ZE, ZT, ZP of the layered elements 103 and 104. As shown in FIG. 7b, such a roughness profile of the middle layer 3E, 3T, 3P of the layered elements 103 and 104 is translated into the presence of local maxima and minima in the variation of the diffuse light reflection $RL_{diff}(ZT)$ in the transition zone, which are such that:
the curve (shown with a dotted line in FIG. 7b) passing through the value of diffuse light reflection at the junction of the transition zone ZT with the screen zone ZE and through the local maxima is decreasing, and
the local minima are approximately zero, which corresponds to portions of the middle layer 3T having a mean square slope Rdq less than 0.2°.

Figure 8A:
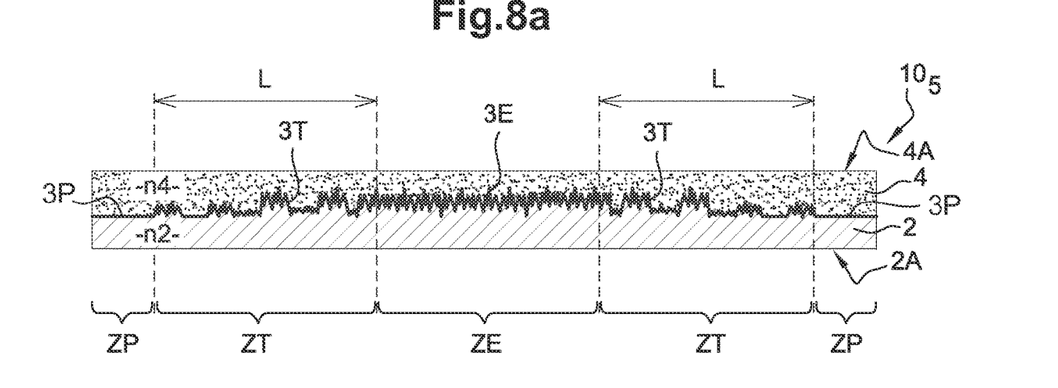
FIG. 8a is a schematic partial cross section of a layered element according to a fifth embodiment of the invention.
Figure 8B:
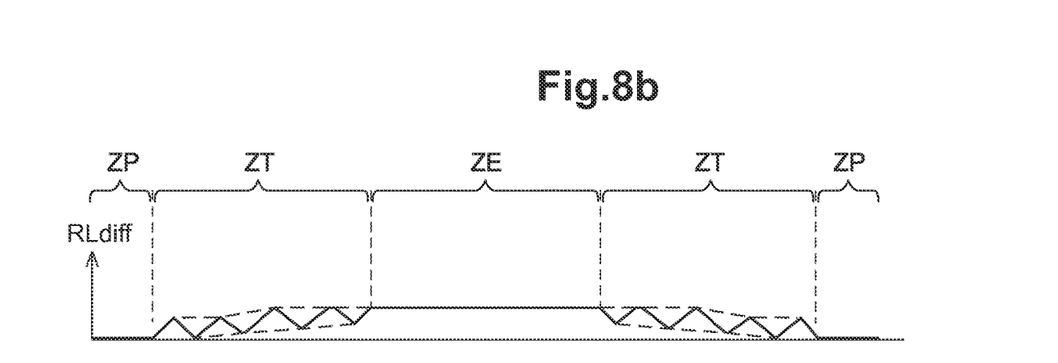

In the fifth embodiment shown in FIGS. 8a and 8b, the invention is also implemented by reducing the density of textured regions or portions with diffuse reflection from the screen zone ZE to the peripheral zone ZP, whereas the middle layers 3E, 3T, 3P all have an identical thickness and an identical chemical composition.

The layered element 105 of the fifth embodiment differs from that of the third and fourth embodiments by the roughness profile of the middle layer 3E, 3T, 3P in each zone ZE, ZT, ZP, which can be seen in FIG. 8a. As shown in FIG. 8b, the roughness profile of the middle layer 3E, 3T, 3P of the layered element 105 is translated into the presence of local maxima and minima in the variation of the diffuse light reflection $RL_{diff}(ZT)$ in the transition zone, which are such that:
the curve (shown with a dotted line in FIG. 8b) passing through the value of diffuse light reflection at the junction of the transition zone ZT with the screen zone ZE and through the local maxima is decreasing, and
the curve (shown with a dotted line in FIG. 8b) passing through the local minima and through the value of diffuse light reflection at the junction of the transition zone ZT with the peripheral zone ZP is decreasing.

In practice, in the embodiments described above, the roughness profile of the middle layer of each zone ZE, ZT, ZP of the layered element 101, 102, 103, 104, 105 may be obtained by depositing the or each layer of the middle layer with constant thickness and composition conformably on a substrate having suitable texturing, which may be obtained by any known method of texturing, for example by embossing the surface of the substrate, by abrasion, by sand blasting, by chemical treatment or by etching, using for example masks to adjust the roughness profile of each part of the substrate surface.

Figure 9:
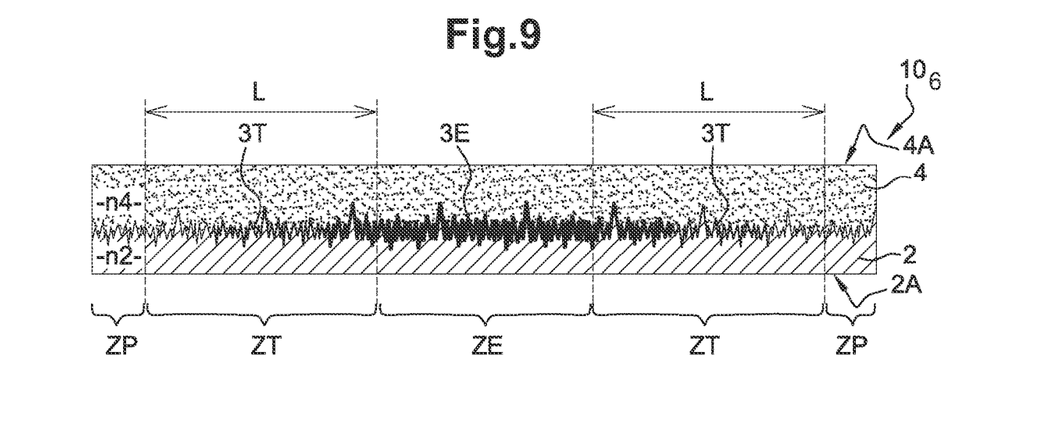
FIG. 9 is a schematic partial cross section of a layered element according to a sixth embodiment of the invention.

In the sixth embodiment of a layered element 106 shown in FIG. 9, the decrease in the variation of the diffuse light reflection in the transition zone ZT going from the screen zone ZE to the peripheral zone ZP is obtained by a continuous decrease of the thickness of the middle layer 3T of the transition zone ZT, from the screen zone ZE to the peripheral zone ZP, whereas the middle layers 3E, 3T have an identical roughness profile and an identical chemical composition and there is no middle layer (or there is a middle layer 3P of zero thickness) in the peripheral zone ZP.

As an example, referring to FIG. 9:
in the screen zone ZE, the textured middle layer 3E is a layer of $TiO_2$ having a thickness e(ZE) of the order of 60 nm;
in the peripheral zone ZP, there is no middle layer 3P and the outer layers 2 and 4 are directly in contact with one another;
in the transition zone ZT, which has a width L of 5 mm, the textured middle layer 3T is a layer of $TiO_2$ having a thickness e(ZT) that decreases continuously, from the value of the thickness e(ZE) of 60 nm at the junction with the screen zone ZE, to a value of zero at the junction with the peripheral zone ZP.

In practice, the thickness profile of the middle layer of each zone ZE, ZT, ZP of the layered element 106 may be obtained by depositing the or each layer of the middle layer of constant composition conformably on a substrate having constant roughness, by modulating the deposition thickness. As an example, the middle layer 3T may be deposited by magnetron cathode sputtering, the thickness of the deposit being modulated by introducing masks in the magnetron chamber. Advantageously, this embodiment makes it possible to use commercial textured substrates such as those listed above as the deposition substrate.

The invention is not limited to the examples described and illustrated.

In particular, according to a variant not shown in the figures, it is possible to change the variation of the diffuse light reflection between the different zones of the layered element by varying the refractive index of the middle layer, for a given constant thickness and roughness profile of the middle layer. The appropriate profile of chemical composition of the middle layer of each zone of the layered element may then be obtained by depositing the or each layer of the middle layer with constant thickness conformably on a substrate having constant roughness, with modulation of the composition of the layer during deposition. The middle layer of the transition zone may for example be deposited by magnetron cathode sputtering using two targets with different compositions, in particular a first target for depositing a dielectric material with high refractive index, such as $TiO_2$, and a second target for depositing a dielectric material with low refractive index, such as $SiO_2$, and by producing a gradient of composition of the deposited layer more and more in favor of the material with low refractive index on approaching the peripheral zone, so as to obtain a decrease in refractive index of the middle layer from the screen zone to the peripheral zone. As an example, the two targets used may be a first target of titanium and a second target of $S_1$:Al at 92:8 wt %, under $Ar/O_2$ plasma, with a deposition pressure of $2 \cdot 10^{-3}$ mbar.

According to another variant not shown in the figures, the invention may be implemented by reducing the density of regions or portions in the transition zone that are provided with a middle layer going from the screen zone to the peripheral zone, for a given constant roughness profile. In this case, the middle layer of the transition zone is discontinuous. As an example, the transition zone may comprise portions that are provided with a middle layer identical to that of the screen zone and portions that lack a middle layer, the distribution being more and more in favor of the portions that lack middle layers on approaching the peripheral zone.

Moreover, a layered element according to the invention may be a flexible film. In particular, architectures similar to the embodiments shown in the figures may be envisaged with flexible substrates of organic polymer material, instead of glass substrates. Moreover, when the layered element is a flexible film, it is advantageously provided, on one of its outer main surfaces, with a layer of adhesive covered with a protective strip (liner) intended to be removed for gluing the film. The layered element in the form of flexible film may then be attached by gluing on an existing surface, for example a surface of transparent glazing, in order to endow this surface with properties of diffuse reflection at the level of each screen zone and transition zone, while maintaining properties of specular transmission through the glazing.

The layered element according to the invention may be used for all known applications of glazing, such as for vehicles, buildings, street furniture, interior furnishings, billboards, projection screens, etc., where we wish to obtain transparent glazing allowing images to be projected, by projection or back projection, while ensuring clear vision through the glazing with a uniform overall visual appearance.

The invention claimed is:

1. A transparent layered element comprising two transparent outer layers having approximately the same refractive index and each having a smooth outer main surface, the transparent layered element comprising:
a screen zone with properties of diffuse reflection and specular transmission comprising a textured middle layer interposed between the two transparent outer layers, which defines textured contact surfaces, parallel to one another, having a mean square slope Rdq strictly greater than 0.2°, the textured middle layer of the screen zone comprising at least one transparent layer with a refractive index different from that of the two transparent outer layers or a metallic layer, and
a peripheral zone with properties of specular reflection and specular transmission,
a transition zone with properties of diffuse reflection and specular transmission between the screen zone and the peripheral zone, the transition zone comprising a textured middle layer interposed between the two transparent outer layers, which defines textured contact surfaces, parallel to one another, having a mean square slope Rdq strictly greater than 0.2°, the middle layer of the transition zone comprising at least one transparent layer with a refractive index different from that of the two transparent outer layers or a metallic layer,
and wherein a diffuse light reflection at any point of the transition zone is less than or equal to a diffuse light reflection at any point of the screen zone and a variation of the diffuse light reflection in the transition zone from the screen zone to the peripheral zone, in any direction joining the screen zone to the peripheral zone, is decreasing or such that the curve passing through the value of diffuse light reflection at the junction of the transition zone with the screen zone and through the or each local maximum of the variation of the diffuse light reflection in the transition zone is decreasing, the decrease in the variation of the diffuse light reflection in the transition zone, or the curve passing through the or each local maximum of the variation of the diffuse light reflection in the transition zone, being obtained by varying at least one parameter from the mean square slope and the total light reflection of the middle layer of the transition zone, in any direction joining the screen zone to the peripheral zone.

2. The layered element as claimed in claim 1, wherein, in any direction joining the screen zone to the peripheral zone, the variation of the diffuse light reflection in the transition zone is less than or equal to (20%)RL(ZE)/mm, where RL(ZE) is the mean total light reflection of the screen zone.

3. The layered element as claimed in claim 1, wherein the variation of the diffuse light reflection in the transition zone from the screen zone to the peripheral zone, in any direction joining the screen zone to the peripheral zone, is such that the curve passing through the value of diffuse light reflection at the junction of the transition zone with the screen zone and through the or each local minimum of the variation of the diffuse light reflection in the transition zone is decreasing.

4. The layered element as claimed in claim 1, wherein the variation of the diffuse light reflection in the transition zone decreases continuously from the screen zone to the peripheral zone, in any direction joining the screen zone to the peripheral zone.

5. The layered element as claimed in claim 1, wherein the variation of the diffuse light reflection in the transition zone is decreasing from the screen zone to the peripheral zone, in any direction joining the screen zone to the peripheral zone, by at least one step for which the diffuse light reflection at any point of the step is strictly less than the diffuse light reflection at any point of the screen zone and of any preceding step closer to the screen zone.

6. The layered element as claimed in claim 1, wherein, in any direction joining the screen zone to the peripheral zone, the transition zone comprises at least two successive regions going from the screen zone to the peripheral zone, each region being formed by combining two portions comprising a first portion closer to the screen zone and a second portion closer to the peripheral zone, where the mean diffuse light reflection of the first portion is strictly less than the mean diffuse light reflection of the second portion, the successive regions having a distribution more and more in favor of the first portion on approaching the peripheral zone.

7. The layered element as claimed in claim 1, wherein, in any direction joining the screen zone to the peripheral zone, the variation of the blurring in transmission of the transition zone is less than or equal to 0.7%/mm.

8. The layered element as claimed in claim 1, wherein, in any direction joining the screen zone to the peripheral zone, the variation of the clarity of the transition zone is less than or equal to 0.5%/mm.

9. The layered element as claimed in claim 1, wherein a first parameter from the mean square slope and the total light reflection of the middle layer of the transition zone is constant and equal to the corresponding parameter of the middle layer of the screen zone, whereas the second parameter from the mean square slope and the total light reflection of the middle layer of the transition zone is less than or equal to the corresponding parameter of the middle layer of the screen zone and has a variation decreasing from the screen zone to the peripheral zone, in any direction joining the screen zone to the peripheral zone.

10. The layered element as claimed in claim 1, wherein, in any direction joining the screen zone to the peripheral zone the variation of the mean square slope of the middle layer of the transition zone has a variation less than or equal to 3.5°/mm.

11. The layered element as claimed in claim 10, wherein the variation is less than or equal to 2°/mm.

12. The layered element as claimed in claim 1, wherein, in any direction joining the screen zone to the peripheral zone, the variation of the total light reflection of the middle layer of the transition zone has a variation less than or equal to (20%)RL(ZE)/mm, where RL(ZE) is the mean total light reflection of the screen zone.

13. The layered element as claimed in claim 1, wherein the middle layer of the transition zone has a refractive index equal to the refractive index of the middle layer of the screen zone, the variation of the total light reflection of the middle layer of the transition zone being decreasing from the screen zone to the peripheral zone, in any direction joining the screen zone to the peripheral zone, by decrease of the thickness of the middle layer from the screen zone to the peripheral zone.

14. The layered element as claimed in claim 1, wherein the middle layer of the transition zone has a thickness equal to the thickness of the middle layer of the screen zone, the variation of the total light reflection of the middle layer of the transition zone being decreasing from the screen zone to the peripheral zone, in any direction joining the screen zone to the peripheral zone, by variation of the refractive index of the middle layer from the screen zone to the peripheral zone.

15. The layered element as claimed in claim 1, wherein the layered element is a flexible film.

16. A transparent glazing comprising a layered element as claimed in claim 1.

17. The transparent glazing as claimed in claim 16, further comprising at least one additional layer positioned against the layered element, selected from:
    transparent substrates selected from polymers, glasses or ceramics comprising two smooth main surfaces,
    hardenable materials initially in a viscous, liquid or pasty state suitable for forming operations,
    interposed lamellae based on polymer material.

18. The transparent glazing as claimed in claim 17, wherein the at least one additional layer is a sol-gel layer.

19. The transparent glazing as claimed in claim 17, wherein the interposed lamellae based on polymer material is thermoformable or pressure-sensitive.

20. The transparent glazing as claimed in claim 16, further comprising at least one antireflective coating at the interface between the air and the material constituting the layer forming an outer main surface of the glazing intended to be opposite relative to a projector during projection of images on the screen zone.

* * * * *